United States Patent [19]

Berg et al.

[11] Patent Number: 5,390,063
[45] Date of Patent: Feb. 14, 1995

[54] VIDEO CASSETTE PRESSURE FLAP

[75] Inventors: Michael J. Berg, Mount Prospect; Richard J. Ciochon, Chicago; Jerome T. McGee, Arlington Heights, all of Ill.

[73] Assignee: Plitek Corporation, Elk Grove Village, Ill.

[21] Appl. No.: 671,369

[22] Filed: Mar. 19, 1991

[51] Int. Cl.⁶ .................................. G11B 23/02
[52] U.S. Cl. .................. 360/132; 360/130.33; 226/196; 242/346.1
[58] Field of Search ............ 360/132, 130.3–130.33; 242/197–201, 75.3, 76; 226/196

[56] References Cited

U.S. PATENT DOCUMENTS

| | | | |
|---|---|---|---|
| 3,547,370 | 12/1970 | Unterdurrbach | 242/76 |
| 3,588,346 | 6/1971 | Ramig, Jr. | 242/76 |
| 3,749,851 | 7/1973 | Nakamichi | 360/130.31 |
| 3,797,779 | 3/1974 | Esashi et al. | 242/199 |
| 3,841,582 | 10/1974 | Schaeffer et al. | 242/76 |
| 3,961,763 | 6/1976 | Somers | 242/76 |
| 4,098,446 | 7/1978 | Schoettle et al. | 226/196 |
| 4,290,567 | 9/1981 | Saito | 242/198 |
| 4,290,704 | 9/1981 | Matthias | 226/196 |
| 4,291,350 | 9/1981 | King et al. | 360/130.3 |
| 4,304,374 | 12/1981 | Okamura et al. | 242/199 |
| 4,342,436 | 8/1982 | Oyama et al. | 242/199 |
| 4,405,097 | 9/1983 | Gebeke | 242/199 |
| 4,458,858 | 7/1984 | Nelson | 360/132 |
| 4,620,255 | 10/1986 | Cook et al. | 360/132 |
| 4,621,779 | 11/1986 | Fitterer et al. | 360/132 |
| 4,625,252 | 11/1986 | Balz | 360/130.3 |
| 4,632,334 | 12/1986 | Schaeffer et al. | 360/132 |
| 4,639,967 | 2/1987 | Bordignon | 360/137 X |
| 4,709,290 | 11/1987 | Schoettle et al. | 360/132 |
| 4,736,904 | 4/1988 | Schoettle et al. | 242/76 |
| 4,770,367 | 9/1988 | Carroll | 242/199 |
| 4,819,890 | 4/1989 | Carroll | 242/76 |
| 4,882,645 | 11/1989 | Bordignon | 360/132 |
| 4,942,492 | 7/1990 | Che | 360/132 |
| 5,041,939 | 8/1991 | Hiramoto et al. | 360/132 |
| 5,081,555 | 1/1992 | Rohloff | 360/132 |
| 5,115,365 | 5/1992 | Hashizume et al. | 360/132 |
| 5,213,246 | 5/1993 | Crowley | 226/196 |

OTHER PUBLICATIONS

Paxon Polymer Company's Technical Data Grade: AA60-003; High-Density Polyethylene report.

Primary Examiner—A. J. Heinz
Assistant Examiner—Jefferson Evans
Attorney, Agent, or Firm—Hill, Steadman & Simpson

[57] ABSTRACT

A pressure flap for eliminating slack in a tape cassette. The pressure flap includes a body portion having a tape contact edge at a first end thereof, and a fold line at a second end thereof. The body portion is bowed along a line extending generally parallel to the fold line. The pressure flap also includes a folded portion extending contiguously from the fold line of the body portion at a predetermined angle. The body portion includes a pair of opposed lateral edges secured to a pair of opposed sides of the folded portion. In a preferred embodiment, the pressure flap is fabricated from carbon-filled, high-density polyethylene, and the opposed sides of the folded portion are fused to the lateral edges of the body portion during fabrication of the pressure flap.

14 Claims, 1 Drawing Sheet

VIDEO CASSETTE PRESSURE FLAP

TECHNICAL FIELD

The present invention relates to tape cassettes, such as video cassettes, and specifically to a pressure flap for limiting slack in such tape cassettes.

BACKGROUND OF THE INVENTION

The use of slack limiters in cassette tapes, particularly video cassette tapes, is well known. Slack limiters are necessary since excessive looseness or slackness in the run of magnetic tape within the cassette causes the magnetic tape to deviate from a substantially straight path between the tape guides provided at opposite ends of the cassette housing. Thus, excessive looseness or slackness in the magnetic tape run causes the magnetic tape not to be properly engaged by the magnetic head or by the tape engaging member of the tape loading device. Such improper engagement may lead to damage of the magnetic tape, or to defective recording or reproducing functions, and may also contribute to damage or deterioration of the tape during storage or non-use of the tape cassette.

Various solutions have been promogated to alleviate the problem of excessive tape slackness within a tape cassette. One of these known solutions involves the provision of resiliently flexible elements, or pressure flaps, secured within the cassette housing in contact with the tape run. The pressure flaps are deflected in response to tension in the engaged tape portion to provide progressively increased resistance to movement of the magnetic tape that deviates from a substantially straight path between the tape guides.

Currently known pressure flaps usually include a generally planar body portion having a tape engaging edge at one end, with a securing arrangement at an opposite end. Configurations of the securing arrangements have included using adhesives to glue the pressure flap into place, arrangements in which the pressure flap is secured to a post within the cassette housing, and various arrangements in which a flap or folded portion is received within a recess in the cassette housing. Pressure flaps utilizing the latter approach employ a generally planar tab or folded portion extending at an angle from the planar body portion of the pressure flap. During assembly of the cassette, the tab or folded portion of the pressure flap is inserted into a correspondingly-shaped recess provided in one half of the cassette housing.

Known pressure flaps have exhibited several disadvantages. The flat configuration of the body portion, in conjunction with the relatively small side of the pressure flap, results in making single piece handling during production of the pressure flaps, and during assembly of the cassette housing, relatively difficult. Since both sides of the flat body portion are identical, there is no means by which the pressure flap may be positively oriented for assembly and insertion into the cassette, other than by visual inspection. Furthermore, the flat configuration necessitates that the strength and resiliency of the pressure flap is largely dependent upon the material from which the flap is fabricated.

SUMMARY OF THE INVENTION

It is, therefore, an object of the present invention to provide a pressure flap for limiting slack in a tape cassette that is easy to handle during production, and during assembly of the tape cassette. It is a further object of the invention to provide a pressure flap having a configuration that provides additional strength beyond that afforded by the material from which the pressure flap is fabricated.

It is yet another object of the invention to provide a pressure flap that can be oriented to facilitate handling.

These and other objects of the invention are achieved by the provision of a pressure flap including a body portion having a tape contact edge at a first end thereof, and a fold line at a second end thereof. The body portion is bowed along a line extending generally parallel to the fold line. A folded portion extends contiguously from the fold line of the body portion at a predetermined angle.

In a preferred embodiment, the body portion includes opposed lateral edges extending between the first and second ends, and the folded portion includes a pair of opposed sides, at least one of which is secured to a respective lateral edge of the body portion. The opposed sides and lateral edges may be fused together during fabrication of the pressure flap.

The pressure flap may be fabricated from carbon-filled, high-density polyethylene, and a light hole may be punched in the body portion.

The folded portion of the pressure flap may be bowed symmetrically with respect to the body portion.

Other objects and advantages of the present invention will be apparent upon reference to the accompanying description when taken in conjunction with the following drawings.

DESCRIPTION OF THE PREFERRED EMBODIMENT

Figure 1:
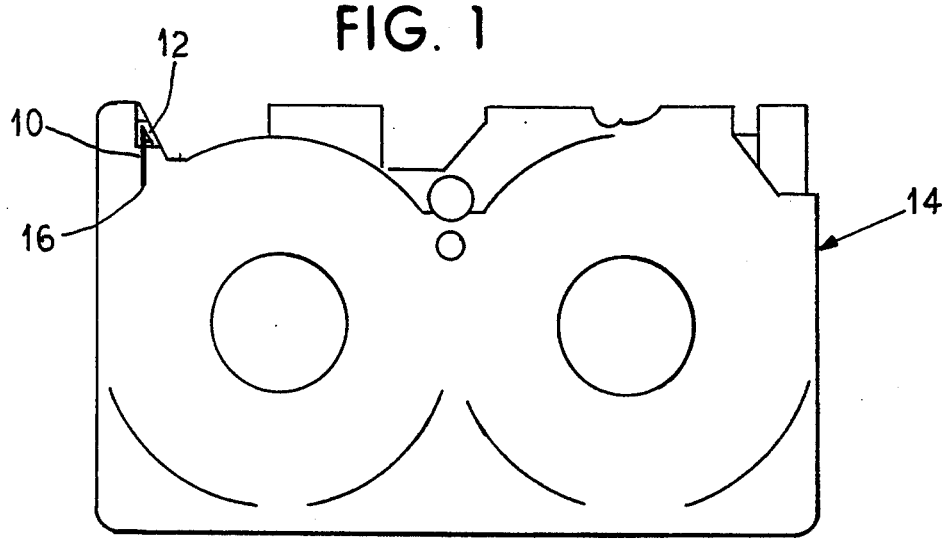
FIG. 1 illustrates a schematic view of a VHS tape cassette including a pressure flap embodying the present invention.

In FIG. 1, a pressure flap 10 embodying the principles of the present invention is shown inserted into a mounting recess 12 of one half of a VHS tape cassette housing 14. The pressure flap 10 includes a tape contact edge 16 located in a position such that it is in contact with the tape run during operation of the cassette 14.

Figure 2:
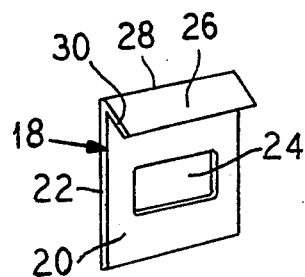
FIG. 2 illustrates a perspective view of a known pressure flap.

A typical known pressure flap 18 is shown in FIG. 2. The known pressure flap 18 includes a body portion 20 having a pair of lateral edges 22. The body portion 20 is further provided with a light hole 24. The pressure flap 18 also includes a folded portion 26 that extends contiguously from the body portion 20, and is joined to the body portion along a fold line 28. The folded portion 26 extends at an angle from the body portion 20, and the opposed sides 30 are not attached to the lateral edges 22.

Both the body portion 20 and the folded portion 26 have a generally planar configuration.

Figure 3:
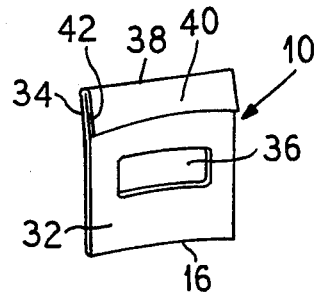
FIG. 3 illustrates a perspective view of a pressure flap embodying the principles of the present invention.
Figure 5:
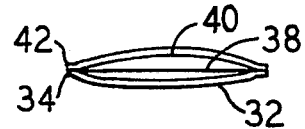
FIG. 5 illustrates a sectional view taken generally along lines V—V of FIG. 4.
Figure 4:
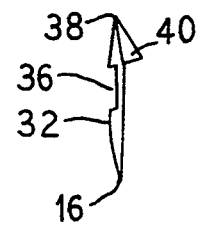
FIG. 4 illustrates a side view of the pressure flap of FIG. 3.

The pressure flap 10 embodying the principles of the present invention is shown in detail in FIGS. 3 through 5. The pressure flap 10 includes a body portion 32 having a pair of lateral edges 34 located on opposite sides of the tape contact edge 16. A light hole 36 is provided in the body portion 32, generally centrally thereof. The body portion 32 also includes a fold line 38 located opposite the tape contact edge 16. The pressure flap 10 further includes a folded portion 40 that extends contiguously from the fold line of the body portion at a predetermined angle. The folded portion includes a pair of opposed sides 42 that are secured to the lateral edges 34 of the body portion 32. A preferred method of fusing the sides 42 to the lateral edges 34 will be described in detail hereinbelow. However, it is to be understood that the sides 42 could be secured to the lateral edges 34 by any of a variety of methods, for example by adhesives or heat-bonding.

As can be seen in FIGS. 4 and 5, attachment of the opposite sides 42 to the lateral edges 34 results in a bowed configuration of the body portion 32, and of the folded portion 40, along a line extending generally parallel to the fold line 38. FIG. 5 shows that the folded portion 40 is bowed generally symmetrically with respect to the body portion 32, with the fold line 38 occurring approximately at the axis of symmetry.

Figure 6:
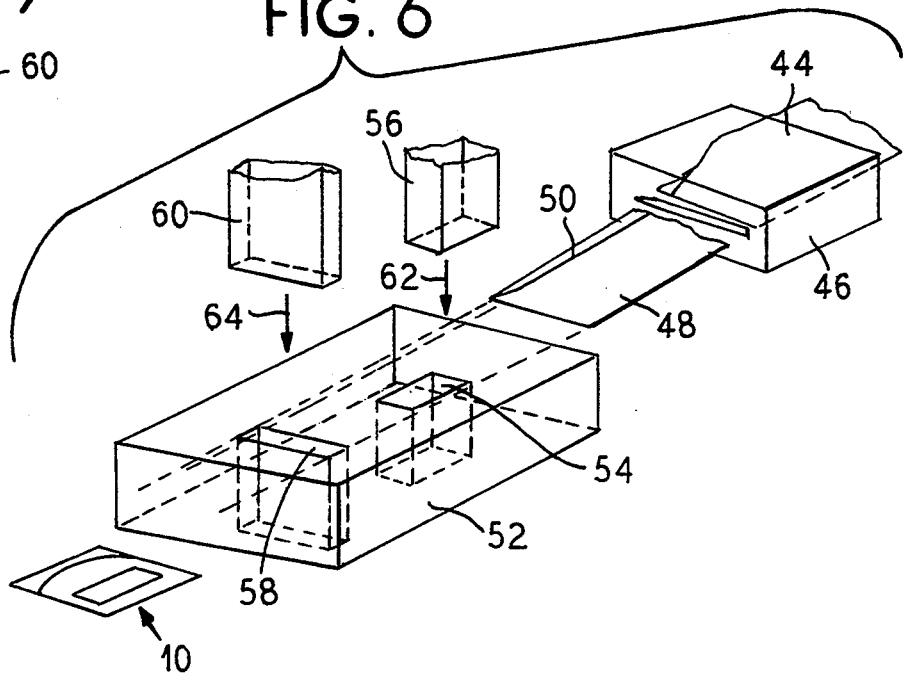
FIG. 6 illustrates a schematic view of a method for fabricating pressure flap according to the present invention.

A preferred method of fabricating a pressure flap according to the present invention is shown schematically in FIG. 6. In this preferred method, high density polyethylene stock 44 is fed through a forming die 46. Preferably, the stock 44 is a medium molecular weight distribution high-density polyethylene which is characterized by high stiffness, excellent melt uniformity, and chemical inertness. One example of such material is the commercially available Paxon®60-003. The material has a thickness of approximately 200 microns, and has a carbon filler that provides the material with lubricity and black pigmentation.

Upon exiting the forming die 46, the stock 44 takes the form of a preshape 48 having a folded edge 50. The preshape 48 is then fed into a cutting die 52. The cutting die 52 is provided with a die recess 54 adapted to receive a light hole cutting punch 56, and with a die recess 58 adapted to receive a severing punch 60. As the preshape 48 is fed through the cutting die 52, the light hole cutting punch is actuated in the direction of the arrow 62, through the die recess 54, to punch a light hole. Subsequently, the severing punch 60 is actuated in the direction of the arrow 64 to cut the preshape 48 into individual pressure flaps 10.

Figure 7:
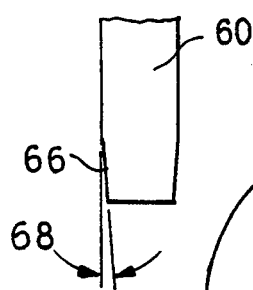
FIG. 7 illustrates a side view of a severing punch for use in the method illustrated in FIG. 6.

As can be seen in FIG. 7, the severing punch 60 is provided with a pair of opposed angled cutting edges 66. The angled cutting edges 66 are formed at an angle of approximately 1.5°. The tolerance between the severing punch 60 and the die recess 58 is preferably no greater than 0.0005 inches.

The combination of friction, heat, and pressure developed by the severing punch 60 passing through the preshape 48 acts upon the carbon-filled high-density polyethylene material to slightly fuse the edges of the pressure flap 10 together, thus securing the opposite sides 42 of the folded portion 40 to the lateral edges 34 of the body portion 32. This fusion results in the bowed configuration of the pressure flap 10 shown in FIGS. 3 through 5.

It is to be understood that the foregoing description sets forth an embodiment of the present invention that is merely illustrative. It is contemplated that the bowed configuration of the pressure flap could be achieved by other methods, for example by extrusion. Furthermore, it is also contemplated that the bowed configuration could be achieved by securing only one side of the folded portion to a corresponding lateral edge of the body portion of the pressure flap.

Although the present invention has been described with reference to a specific embodiment, those of skill in the art will recognize that changes may be made thereto without departing from the scope and spirit of the invention as set forth in the appended claims.

I claim as my invention:

1. A pressure flap for limiting tape slack in a tape cassette holding a tape therein, said pressure flap comprising the following:

a generally planar body portion having a tape contact edge in contact with a flat side of said tape at a first end thereof, and a fold line at a second end thereof, said body portion being bowed in a geometric plane extending generally parallel to said fold line; and a folded portion extending contiguously from said fold line of said body portion at a predetermined angle, said folded portion being bowed in a geometric plane extending generally parallel to said fold line;

said folded portion adapted to be fixed in position to said tape cassette, and said body portion flexibly cantilevered from said folded portion against said flat side of said tape.

2. A pressure flap according to claim 1, wherein said body portion comprises opposed lateral edges extending between said first and second ends, and said folded portion comprises a pair of opposed sides, at least one of which is secured to one of said lateral edges of said body portion.

3. A pressure flap according to claim 2, wherein each of said sides of said folded portion is secured to a respective lateral edge of said body portion.

4. A pressure flap according to claim 3, wherein said sides of said folded portion are fused to said lateral edges of said body portion.

5. A pressure flap according to claim 1, wherein said pressure flap is fabricated from carbon-filled, high-density polyethylene.

6. A pressure flap according to claim 1, further comprising a light hole in said body portion.

7. A pressure flap according to claim 1, wherein said folded portion is bowed symmetrically with respect to said body portion.

8. A pressure flap for limiting tape slack in a tape cassette holding a tape therein, said pressure flap comprising the following:

a generally planar bowed body portion including a tape contact edge in contact with a flat side of said tape at a first end thereof, a fold line at a second end thereof, and opposed lateral edges extending between said first and second ends; and a bowed folded portion extending contiguously from said fold line of said body portion at a predetermined angle, said folded portion including a pair of opposed generally parallel sides, at least one of which is secured to one of said lateral edges of said body portion along the entire length of said at least one side, said body portion and said folded portion being bowed along a line extending generally parallel to said fold line and bowed outwardly and in opposite directions from a geometric plane containing said fold line;

said folded portion adapted to be fixed in position to said tape cassette, and said body portion flexibly cantilevered from said folded portion to said flat side of said tape.

9. A pressure flap according to claim 8, wherein each of said sides of said folded portion is secured to a respective lateral edge of said body portion.

10. A pressure flap according to claim 9, wherein said sides of said folded portion are fused to said lateral edges of said body portion.

11. A method of fabricating a pressure flap for limiting tape slack in a tape cassette holding a tape therein, said pressure flap to be installed having a contact edge in contact with said tape on a flat side thereof, said method comprising the following steps:

providing a preshape including a generally planar bowed body portion having opposed lateral edges, and a bowed folded portion extending contiguously from a fold line of said body portion at a predetermined angle, said folded portion including a pair of generally parallel opposed sides; and securing at least one of said sides of said folded portion to one of said lateral edges of said body portion along the entire length of said at least one side, said body portion and said folded portion being bowed in profile along a length of a line extending generally parallel to said fold line;

said folded portion adapted to be fixed in position to said tape cassette., and said body portion flexibly cantilevered from said folded portion to said flat side of said tape.

12. A method according to claim 11, wherein said step of securing comprises securing each of said sides of said folded portion to a respective lateral edge of said body portion.

13. A method according to claim 12, wherein said step of securing comprises fusing said sides of said folded portion to said lateral edges of said body portion.

14. A method according to claim 12, wherein said step of securing comprises fusing said sides of said folded portion to said lateral edges of said body portion while simultaneously cutting said pressure flap from a web of carbon-filled, high-density polyethylene material.

* * * * *